March 13, 1934.  H. S. SAWATZKY  1,951,212
EMERGENCY BRAKE RELEASE
Filed Sept. 16, 1932
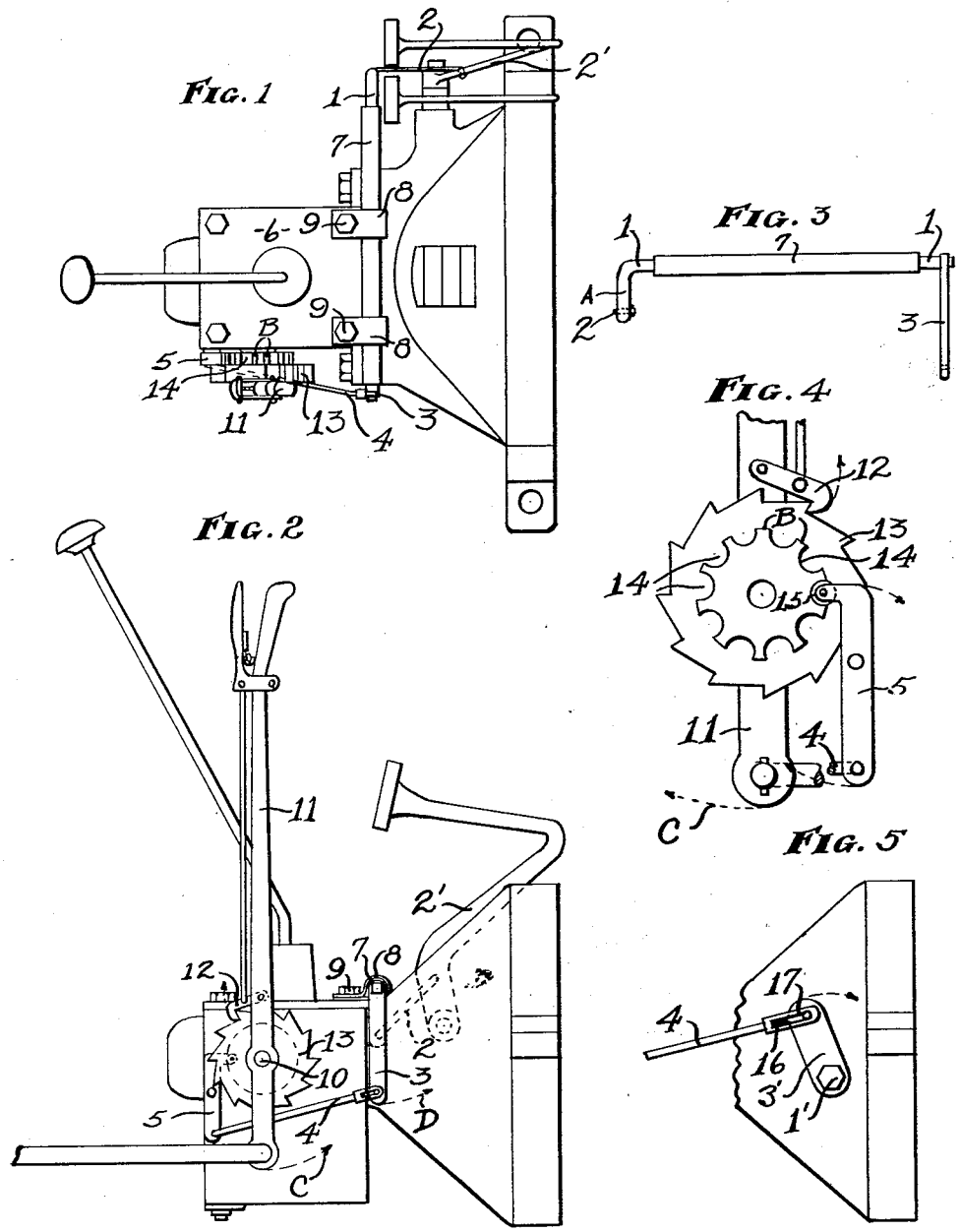
INVENTOR.
Henry S. Sawatzky
BY U. Y. Charles
ATTORNEY.

Patented Mar. 13, 1934

1,951,212

UNITED STATES PATENT OFFICE 1,951,212

EMERGENCY BRAKE RELEASE

Henry S. Sawatzky, Newton, Kans., assignor of one-half to Frank A. Janzen, Newton, Kans.

Application September 16, 1932, Serial No. 633,389

1 Claim. (Cl. 74—39)

My invention relates to an emergency brake release.

The object of my invention is to provide a release for emergency brakes automatically operated.

A further object of my invention is to actuate the release of an emergency brake by the movement of the clutch pedal.

A still further object of my invention is to provide an inexpensive hook up that will automatically release an emergency brake such as commonly employed in automobiles to avoid destruction of the friction elements should the operator fail to release the brake under present arrangement.

These and other objects will hereinafter be more fully explained, reference being had to the accompanying drawing forming a part of this specification, and in which like characters will apply to like parts in the different views.

Referring to the drawing:—

Fig. 1 is a plan view of a combined transmission and clutch housing with the invention applied.

Fig. 2 is a side view of Fig. 1.

Fig. 3 is a detail view of the crank actuating element.

Fig. 4 is an enlarged inside view of the ratchet mechanism.

Fig. 5 is a modified form and application of the crank with respect to the clutch housing fragmentarily shown.

My invention herein disclosed consists of a crank 1, one end of which has a right angled bent portion as at A having a connecting element 2 pivotally connected to the outer end thereof, while the other end of element 2 pivotally engages with arm 2' of the clutch pedal as rocking means for the crank. Removably secured to the other end of the crank is an arm 3 having a link 4, one end of which pivotally connects to the lower end of the arm, the other end pivotally engaging with the lower end of a detent 5 and pivoted on a pin 5' secured to the transmission housing on which it is free to rock.

Secured to the transmission housing 6 thru the medium of clips 8 that are attached to the said housing by cap screws 9 is a pipe 7 in which the same will function as a bearing for the crank 1 rockably carried therein.

Secured to the side of the transmission housing and outwardly extending therefrom is a pin 10 on which the emergency lever 11 is rockably carried. The said lever may be of the conventional type as commonly used and having thereon a pawl 12 to engage with the teeth of a ratchet 13 rotatably carried by the said pin. Concentrically positioned on one side of the ratchet is an outward extension integrally arranged and having a plurality of semi-circular notches 14 spaced therearound and in which the roller 15 trunnioned in the upper end of detent 5 will engage when the clutch pedal retracts to its normal engaged position, by which means the ratchet element is retained against rotation supporting the emergency brake lever in a set position, and when the clutch is disengaged by rocking its respective foot pedal forward the detent is free to rotate being actuated by the emergency brake lever as the same retracts to a disengaged position with respect to the brakes controlled thereby.

In the course of operating the emergency brake, the clutch when disengaged may be retracted at such a point that the roller will contact on the space B between the notches, and to accommodate for such position while the clutch pedal returns, I have arranged a spring 16 carried in a slotted knuckle 17 that pivotally engages with the lower end of arm 3, by which means when the ratchet is turned sufficient to receive the said roller in its selected notch, it will be instantly seated for the purpose heretofore described.

There are types of automobiles that may require a different method of attaching the said crank 1, and in one instant the clutch pedal rod 1' is positioned thru the clutch housing as shown in Fig. 5, which case the arms 3' is attached to the outer end thereof as actuating means for the connecting rod 4 causing the mechanism herein disclosed to function as in the other arrangement, and such other modifications may be employed as may be required by variations of motors and other details with respect to automobiles so long as the principle of automatically releasing the brake set forth as my invention is maintained.

It is now clearly shown that the emergency brake may be set moving the same in the direction shown by dotted line C and will be released when the said crank 1 is rocked in the direction shown by dotted line D which is accomplished by disengagement of the clutch thru the movement of its foot pedal disengaging the same.

Furthermore, the emergency brake lever is operative in the usual manner by releasing the pawl thru the conventional grip as commonly employed when the clutch is engaged. The emergency equipment disclosed clearly shows that certainty of preserving the emergency brake capacity automatically regardless the knowledge of the operator concerning the automatic feature.

Having fully described my invention, what I claim as new and desire to secure by Letters Patent is:

In an emergency brake release, in combination with a clutch pedal and transmission housing and brake lever and pin therefor, a crank rockably carried on the housing, one end having a right angle bend toward the pedal and connected thereto as rocking means for the crank, the other end having an arm attached and rockable therewith, and means to connect the free end of the arm to one end of a detent, a toothed ratchet wheel and a notched wheel axially aligned and secured together and trunnioned on the brake lever pin, the brake lever having a pawl to engage with the teeth of the ratchet wheel to retain the lever in a set position, said detent pivotally carried on the housing in working relation to the notched wheel, the detent having a roller on one end to engage in the notches of the wheel to lock the ratchet wheel from turning in either direction, the detent released from the wheel when the crank is rocked to release the brake lever, all as and for the purpose specified.

HENRY S. SAWATZKY.